US012063584B2

(12) United States Patent
Casati et al.

(10) Patent No.: US 12,063,584 B2
(45) Date of Patent: Aug. 13, 2024

(54) METHOD AND APPARATUS FOR ENFORCEMENT OF MAXIMUM NUMBER OF USER EQUIPMENTS PER NETWORK SLICE IN A COMMUNICATION SYSTEM

(71) Applicant: Nokia Technologies Oy, Espoo (FI)

(72) Inventors: Alessio Casati, West Molesey (GB); Bruno Landais, Pleumeur-Bodou (FR)

(73) Assignee: Nokia Technologies Oy, Espoo (FI)

( * ) Notice: Subject to any disclaimer, the term of this patent is extended or adjusted under 35 U.S.C. 154(b) by 237 days.

(21) Appl. No.: 17/617,347

(22) PCT Filed: Jun. 10, 2019

(86) PCT No.: PCT/IB2019/054833
§ 371 (c)(1),
(2) Date: Dec. 8, 2021

(87) PCT Pub. No.: WO2020/250005
PCT Pub. Date: Dec. 17, 2020

(65) Prior Publication Data
US 2022/0256439 A1    Aug. 11, 2022

(51) Int. Cl.
*H04W 48/18*    (2009.01)
*H04W 48/06*    (2009.01)
*H04W 60/00*    (2009.01)

(52) U.S. Cl.
CPC ........... *H04W 48/06* (2013.01); *H04W 48/18* (2013.01); *H04W 60/00* (2013.01)

(58) Field of Classification Search
CPC ... H04W 84/042; H04W 36/14; H04W 48/18; H04W 24/02; H04W 48/00; H04W 60/00;
(Continued)

(56) References Cited

U.S. PATENT DOCUMENTS 8,548,463 B2    10/2013   Vrbaski et al.
2017/0303259 A1  10/2017   Lee et al.
2022/0159605 A1*  5/2022   Li .......................... H04W 60/00

FOREIGN PATENT DOCUMENTS

WO    2019/056365 A1    3/2019

OTHER PUBLICATIONS

Office action received for corresponding Indian Patent Application No. 202247000831, dated Jun. 1, 2022, 6 pages.
(Continued)

*Primary Examiner* — Shukri Taha
(74) *Attorney, Agent, or Firm* — Barta Jones, PLLC

(57) ABSTRACT

Methods, systems, apparatuses, and computer program products for providing an enforcement mechanism for the maximum number of user equipments per network slice in a communication system are provided. A method, system, and apparatus may receive, from a user equipment (UE), a registration request message comprising requested Network Slice Selection Assistance Information (NSSAI) through an access network (AN). The requested NSSAI comprises one or more single-NSSAIs (S-NSSAIs) subject to a capping number of UEs allowed to access one or more network slices associated with the one or more S-NSSAIs. The method, system, and apparatus may cause transmission of a service request message to a network slice selection function (NSSF). The service request message includes indications of the one or more S-NSSAIs. The method, system, and apparatus may receive a service response from the network slice selection function. The service response comprises an allowed NSSAI that includes at least one of 1) one or more allowed S-NSSAIs or 2) a list of rejected S-NSSAIs due to a maximum number of UEs allowed to access the network slices associated with the one or more S-NSSAIs has been reached.

22 Claims, 9 Drawing Sheets

(58) Field of Classification Search
CPC . H04W 28/0289; H04W 60/06; H04W 48/02; H04W 74/085; H04W 76/10; H04W 76/30; H04W 76/34; H04W 60/04; H04W 92/02; H04W 48/06; H04L 41/0895; H04L 41/0897; H04L 67/30; H04L 67/34; H04L 41/5009; H04L 41/40; H04L 41/5054; H04L 41/0816
See application file for complete search history.

(56) References Cited

OTHER PUBLICATIONS

International Search Report and Written Opinion received for corresponding Patent Cooperation Treaty Application No. PCT/IB2019/054833, dated Sep. 30, 2019, 15 pages.
"TS 23.501 OI:4 On Rejected S-NSSAI", 3GPP TSG SA WG2 Meeting #123, S2-177247, Agenda: 6.5.1, Nokia, Oct. 23-27, 2017, pp. 1-5.
"Slice configuration change", SA WG2 Meeting #127-bis, S2-186213, Ericsson, May 28-Jun. 1, 2018, 5 pages.

* cited by examiner

METHOD AND APPARATUS FOR ENFORCEMENT OF MAXIMUM NUMBER OF USER EQUIPMENTS PER NETWORK SLICE IN A COMMUNICATION SYSTEM

RELATED APPLICATION

This application was originally filed as PCT Application No. PCT/IB2019/054833, filed on Jun. 10, 2019, of which is incorporated herein by reference in its entirety.

BACKGROUND

Third generation partnership project (3GPP) $5^{th}$ generation (5G) technology is a next generation of radio systems and network architecture that can deliver extreme broadband and ultra-robust, low latency connectivity. 5G technology improves a variety of telecommunication services offered to the end users, and helps to support massive broadband that delivers gigabytes of bandwidth per second on demand for both the uplink and downlink transmissions. Next generation systems, which utilize the 5G architecture, utilize virtualized radio access network (RAN) functions and core network functions.

In a 5G network, network slicing is a concept for running multiple logical networks as virtually independent business operations on a common physical infrastructure. A Network Slice is considered as an independent virtualized End-to-End Network. Currently, standardization efforts are being made on simplifying the way network slices are defined and a generic slice template document is created by the GSMA (Groupe Speciale Mobile Association). Such standardized template defines various slice types that meet Service Level Agreement (SLA) criteria. One such SLA criteria is a maximum number of user equipment (UE) admitted to a slice. However, under the current 3GPP specifications, enforcing such limit is not possible.

BRIEF SUMMARY

A method, apparatus and computer program product are provided in accordance with an example embodiment to provide an enforcement mechanism for the maximum number of user equipment per network slice in a communication system.

In one example embodiment, a method is provided that includes receiving, from a user equipment (UE), a registration request message comprising requested Network Slice Selection Assistance Information (NSSAI) through an access network (AN). The requested NSSAI comprises one or more single-NSSAIs (S-NSSAIs) subject to a capping number of UEs allowed to access one or more network slices associated with the one or more S-NSSAIs. The method further includes causing transmission of a service request message to a network slice selection function (NSSF). The service request message includes indications of the one or more S-NSSAIs. The method further includes receiving a service response from the network slice selection function. The service response comprises an allowed NSSAI that includes at least one of 1) one or more allowed S-NSSAIs or 2) a list of rejected S-NSSAIs due to a maximum number of UEs allowed to access the network slices associated with the one or more S-NSSAIs has been reached. The method further includes causing transmission of a registration response message comprising at least one of 1) the one or more allowed S-NSSAIs or 2) the list of rejected S-NSSAIs due to the maximum number of UEs allowed to access the network slices associated with the one or more S-NSSAIs has been reached to the user equipment.

In some implementations of such a method, the service response is dedicated to enforcement of the capping number of UEs per network slice. In some embodiments, the one or more S-NSSAIs are each associated with S-NSSAI subscription information that includes a flag indicating a need to perform a limitation of a number of subscribers or a limitation of a number of allowed UEs. In some embodiments, the service response or registration response message further comprises an indication indicating that rejected S-NSSAIs are caused by upper limit of UEs per slice reached and an optional backoff timer indicating a wait time before attempting another registration request message including the rejected S-NSSAIs in the list of rejected S-NSSAIs. In some embodiments, the method further includes: determining that the UE is no longer using one or more S-NSSAIs of the one or more allowed S-NSSAIs. The determining is based on receiving a deregistration request from the user equipment or receiving a requested NSSAI in a new registration request message no longer including one or more of the S-NSSAIs subject to capping from a previous Allowed NSSAI; and causing transmission of a service request message comprising an indication that the UE is no longer using the one or more S-NSSAIs to cause the NSSF to decrement one or more counters of number of UEs using the Network Slice(s) for the one or more S-NSSAIs that are no longer used.

In another example embodiment, a method is provided that includes receiving, at a network slice selection function (NSSF), a service request message comprising one or more single Network Slice Selection Assistance Information (S-NSSAIs) subject to a capping number of user equipments (UEs) allowed to access one or more network slices associated with the one or more S-NSSAIs from an access and mobility function (AMF). The method further includes determining, by the NSSF, a current number of UEs allowed to access the one or more network slices associated with the one or more S-NSSAIs. The method further includes for each S-NSSAI: in an instance where the number of UE allowed to access does not exceed a pre-defined limit on the maximum number of UEs using the network slice associated with the S-NSSAI, designating the S-NSSAI as an allowed S-NSSAI and incrementing a counter of number of UEs using the Network Slice associated with the S-NSSAI; and in an instance where the number of UE allowed to access the network slice exceeds a pre-defined limit on the network slice associated with the S-NSSAI, designating the S-NSSAI as a rejected S-NSSAI. The method further includes causing transmission of a service response comprising an allowed NSSAI that includes at least one of 1) one or more allowed S-NSSAIs or 2) a list of rejected S-NSSAIs due to a maximum number of UEs allowed to access the network slices associated with the one or more S-NSSAIs has been reached.

In some implementations of such a method, the NSSF is configured to decrement one or more counters of number of UEs using the one or more network slices associated with the one or more S-NSSAIs upon receiving an indication that the UE is no longer using the one or more S-NSSAIs. In some embodiments, the NSSF is configured by a visited public land mobile network based on a roaming agreement on a maximum number of UEs allowed per S-NSSAI for a home public land mobile network S-NSSAI. In some embodiments, the NSSF is configured based on a service level agreement. In some embodiments, the NSSF is a NSSF in a visited public land mobile network configured to interact with a NSSF of a home public land mobile network in an instance where the UE is roaming and a visited network detects that the UE inbound roamer is requesting or abandoning S-NSSAIs subject to capping and the counters of the current number of UEs allocated to access the network slice(s) are in the NSSF of the home public land mobile network. In some embodiments, the NSSF is configured to, in an instance where the number of UE allowed to access the Network Slice exceeds a pre-defined limit on the network slice associated with the S-NSSAI, alternatively designates the S-NSSAI as allowed S-NSSAI but with a specific charging fee.

In another example embodiment, a method is provided that includes receiving, from a user equipment (UE), a registration request message comprising requested Network Slice Selection Assistance Information (NSSAI) through an access network (AN). The requested NSSAI comprises one or more single-NSSAIs (S-NSSAIs) subject to a capping number of UEs allowed to access one or more network slices associated with the one or more S-NSSAIs. Each of the one or more S-NSSAIs is supported by a single access and mobility function (AMF) or AMF set in a single public land mobile network (PLMN). All AMF in the AMF set share context data for instance using an unstructured data storage function (UDSF). The method further includes for each S-NSSAI: in an instance where the number of UE allowed to access the network slice does not exceed a pre-defined limit on the network slice associated with the S-NSSAI stored in the shared context data, designating the S-NSSAI as an allowed S-NSSAI and incrementing a counter of number of UEs using the network slice associated with the S-NSSAI; and in an instance where the number of UE allowed to access the network slice exceeds a pre-defined limit on the network slice associated with the S-NSSAI stored in the shared context data, designating the S-NSSAI as a rejected S-NSSAI. The method further includes causing transmission of a registration response message comprising the allowed S-NSSAIs or the list of rejected S-NSSAIs to the user equipment.

In another example embodiment, an apparatus comprising processing circuitry and at least one memory including computer program code for one or more programs is provided, the at least one memory and the computer program code configured to, with the processing circuitry, cause the apparatus to receive, from a user equipment (UE), a registration request message comprising requested Network Slice Selection Assistance Information (NSSAI) through an access network (AN). The requested NSSAI comprises one or more single-NSSAIs (S-NSSAIs) subject to a capping number of UEs allowed to access one or more network slices associated with the one or more S-NSSAIs. The at least one memory and the computer program code are further configured to, with the processing circuitry, cause the apparatus to causing transmission of a service request message to a network slice selection function (NSSF). The service request message includes indications of the one or more S-NSSAIs. The at least one memory and the computer program code are further configured to, with the processing circuitry, cause the apparatus to receive a service response from the network slice selection function. The service response comprises an allowed NSSAI that includes at least one of 1) one or more allowed S-NSSAIs or 2) a list of rejected S-NSSAIs due to a maximum number of UEs allowed to access the network slices associated with the one or more S-NSSAIs has been reached. The at least one memory and the computer program code are further configured to, with the processing circuitry, cause the apparatus to cause transmission of a registration response message comprising at least one of 1) the one or more allowed S-NSSAIs or 2) the list of rejected S-NSSAIs due to the maximum number of UEs allowed to access the network slices associated with the one or more S-NSSAIs has been reached to the user equipment.

In some implementations of such an apparatus, the service response is dedicated to enforcement of the capping number of UEs per network slice. In some embodiments, the one or more S-NSSAIs are each associated with S-NSSAI subscription information that includes a flag indicating a need to perform a limitation of a number of subscribers or a limitation of a number of allowed UEs. In some embodiments, the service response or registration response message further comprises an indication indicating that rejected S-NSSAIs are caused by upper limit of UEs per slice reached and an optional backoff timer indicating a wait time before attempting another registration request message including the rejected S-NSSAIs in the list of rejected S-NSSAIs. In some embodiments, at least one memory and the computer program code are further configured to, with the processing circuitry, cause the apparatus to determine that the UE is no longer using one or more S-NSSAIs of the one or more allowed S-NSSAIs. The determining is based on receiving a deregistration request from the user equipment or receiving a requested NSSAI in a new registration request message no longer including one or more of the S-NSSAIs subject to capping from a previous Allowed NSSAI; and causing transmission of a service request message comprising an indication that the UE is no longer using the one or more S-NSSAIs to cause the NSSF to decrement one or more counters of number of UEs using the Network Slice(s) for the one or more S-NSSAIs that are no longer used.

In another example embodiment, an apparatus comprising processing circuitry and at least one memory including computer program code for one or more programs is provided, the at least one memory and the computer program code configured to, with the processing circuitry, cause the apparatus to receive, at a network slice selection function (NSSF), a service request message comprising one or more single Network Slice Selection Assistance Information (S-NSSAIs) subject to a capping number of user equipments (UEs) allowed to access one or more network slices associated with the one or more S-NSSAIs from an access and mobility function (AMF). The at least one memory and the computer program code are further configured to, with the processing circuitry, cause the apparatus to determine, by the NSSF, a current number of UEs allowed to access the one or more network slices associated with the one or more S-NSSAIs. The at least one memory and the computer program code are further configured to, with the processing circuitry, cause the apparatus to for each S-NSSAI: in an instance where the number of UE allowed to access does not exceed a pre-defined limit on the maximum number of UEs using the network slice associated with the S-NSSAI, designate the S-NSSAI as an allowed S-NSSAI and increment a counter of number of UEs using the Network Slice associated with the S-NSSAI; and in an instance where the number of UE allowed to access the network slice exceeds a pre-defined limit on the network slice associated with the S-NSSAI, designate the S-NSSAI as a rejected S-NSSAI. The at least one memory and the computer program code are further configured to, with the processing circuitry, cause the apparatus to cause transmission of a service response comprising an allowed NSSAI that includes at least one of 1) one or more allowed S-NSSAIs or 2) a list of rejected S-NSSAIs due to a maximum number of UEs allowed to access the network slices associated with the one or more S-NSSAIs has been reached.

In some implementations of such an apparatus, the NSSF is configured to decrement one or more counters of number of UEs using the one or more network slices associated with the one or more S-NSSAIs upon receiving an indication that the UE is no longer using the one or more S-NSSAIs. In some embodiments, the NSSF is configured by a visited public land mobile network based on a roaming agreement on a maximum number of UEs allowed per S-NSSAI for a home public land mobile network S-NSSAI. In some embodiments, the NSSF is configured based on a service level agreement. In some embodiments, the NSSF is a NSSF in a visited public land mobile network configured to interact with a NSSF of a home public land mobile network in an instance where the UE is roaming and a visited network detects that the UE inbound roamer is requesting or abandoning S-NSSAIs subject to capping and the counters of the current number of UEs allocated to access the network slice(s) are in the NSSF of the home public land mobile network. In some embodiments, the NSSF is configured to, in an instance where the number of UE allowed to access the Network Slice exceeds a pre-defined limit on the network slice associated with the S-NSSAI, alternatively designates the S-NSSAI as allowed S-NSSAI but with a specific charging fee.

In another example embodiment, an apparatus comprising processing circuitry and at least one memory including computer program code for one or more programs is provided, the at least one memory and the computer program code configured to, with the processing circuitry, cause the apparatus to receive, from a user equipment (UE), a registration request message comprising requested Network Slice Selection Assistance Information (NSSAI) through an access network (AN). The requested NSSAI comprises one or more single-NSSAIs (S-NSSAIs) subject to a capping number of UEs allowed to access one or more network slices associated with the one or more S-NSSAIs. Each of the one or more S-NSSAIs is supported by a single access and mobility function (AMF) or AMF set in a single public land mobile network (PLMN). All AMF in the AMF set share context data for instance using an unstructured data storage function (UDSF). The at least one memory and the computer program code are further configured to, with the processing circuitry, cause the apparatus to for each S-NSSAI: in an instance where the number of UE allowed to access the network slice does not exceed a pre-defined limit on the network slice associated with the S-NSSAI stored in the shared context data, designate the S-NSSAI as an allowed S-NSSAI and increment a counter of number of UEs using the network slice associated with the S-NSSAI; and in an instance where the number of UE allowed to access the network slice exceeds a pre-defined limit on the network slice associated with the S-NSSAI stored in the shared context data, designating the S-NSSAI as a rejected S-NSSAI. The at least one memory and the computer program code are further configured to, with the processing circuitry, cause the apparatus to cause transmission of a registration response message comprising the allowed S-NSSAIs or the list of rejected S-NSSAIs to the user equipment.

In another example embodiment, an apparatus is provided that includes means for receiving, from a user equipment (UE), a registration request message comprising requested Network Slice Selection Assistance Information (NSSAI) through an access network (AN). The requested NSSAI comprises one or more single-NSSAIs (S-NSSAIs) subject to a capping number of UEs allowed to access one or more network slices associated with the one or more S-NSSAIs. The apparatus further includes means for causing transmission of a service request message to a network slice selection function (NSSF). The service request message includes indications of the one or more S-NSSAIs. The apparatus further includes means for receiving a service response from the network slice selection function. The service response comprises an allowed NSSAI that includes at least one of 1) one or more allowed S-NSSAIs or 2) a list of rejected S-NSSAIs due to a maximum number of UEs allowed to access the network slices associated with the one or more S-NSSAIs has been reached. The apparatus further includes means for causing transmission of a registration response message comprising at least one of 1) the one or more allowed S-NSSAIs or 2) the list of rejected S-NSSAIs due to the maximum number of UEs allowed to access the network slices associated with the one or more S-NSSAIs has been reached to the user equipment.

In some implementations of such an apparatus, the service response is dedicated to enforcement of the capping number of UEs per network slice. In some embodiments, the one or more S-NSSAIs are each associated with S-NSSAI subscription information that includes a flag indicating a need to perform a limitation of a number of subscribers or a limitation of a number of allowed UEs. In some embodiments, the service response or registration response message further comprises an indication indicating that rejected S-NSSAIs are caused by upper limit of UEs per slice reached and an optional backoff timer indicating a wait time before attempting another registration request message including the rejected S-NSSAIs in the list of rejected S-NSSAIs. In some embodiments, the apparatus further includes means for: determining that the UE is no longer using one or more S-NSSAIs of the one or more allowed S-NSSAIs. The determining is based on receiving a deregistration request from the user equipment or receiving a requested NSSAI in a new registration request message no longer including one or more of the S-NSSAIs subject to capping from a previous Allowed NSSAI; and causing transmission of a service request message comprising an indication that the UE is no longer using the one or more S-NSSAIs to cause the NSSF to decrement one or more counters of number of UEs using the Network Slice(s) for the one or more S-NSSAIs that are no longer used.

In another example embodiment, an apparatus is provided that includes means for receiving, at a network slice selection function (NSSF), a service request message comprising one or more single Network Slice Selection Assistance Information (S-NSSAIs) subject to a capping number of user equipments (UEs) allowed to access one or more network slices associated with the one or more S-NSSAIs from an access and mobility function (AMF). The apparatus further includes means for determining, by the NSSF, a current number of UEs allowed to access the one or more network slices associated with the one or more S-NSSAIs. The apparatus further includes means for each S-NSSAI: in an instance where the number of UE allowed to access does not exceed a pre-defined limit on the maximum number of UEs using the network slice associated with the S-NSSAI, designating the S-NSSAI as an allowed S-NSSAI and incrementing a counter of number of UEs using the Network Slice associated with the S-NSSAI; and in an instance where the number of UE allowed to access the network slice exceeds a pre-defined limit on the network slice associated with the S-NSSAI, designating the S-NSSAI as a rejected S-NSSAI. The apparatus further includes means for causing transmission of a service response comprising an allowed NSSAI that includes at least one of 1) one or more allowed S-NSSAIs or 2) a list of rejected S-NSSAIs due to a maximum number of UEs allowed to access the network slices associated with the one or more S-NSSAIs has been reached.

In some implementations of such an apparatus, the NSSF is configured to decrement one or more counters of number of UEs using the one or more network slices associated with the one or more S-NSSAIs upon receiving an indication that the UE is no longer using the one or more S-NSSAIs. In some embodiments, the NSSF is configured by a visited public land mobile network based on a roaming agreement on a maximum number of UEs allowed per S-NSSAI for a home public land mobile network S-NSSAI. In some embodiments, the NSSF is configured based on a service level agreement. In some embodiments, the NSSF is a NSSF in a visited public land mobile network configured to interact with a NSSF of a home public land mobile network in an instance where the UE is roaming and a visited network detects that the UE inbound roamer is requesting or abandoning S-NSSAIs subject to capping and the counters of the current number of UEs allocated to access the network slice(s) are in the NSSF of the home public land mobile network. In some embodiments, the NSSF is configured to, in an instance where the number of UE allowed to access the Network Slice exceeds a pre-defined limit on the network slice associated with the S-NSSAI, alternatively designates the S-NSSAI as allowed S-NSSAI but with a specific charging fee.

In another example embodiment, an apparatus is provided that includes means for receiving, from a user equipment (UE), a registration request message comprising requested Network Slice Selection Assistance Information (NSSAI) through an access network (AN). The requested NSSAI comprises one or more single-NSSAIs (S-NSSAIs) subject to a capping number of UEs allowed to access one or more network slices associated with the one or more S-NSSAIs. Each of the one or more S-NSSAIs is supported by a single access and mobility function (AMF) or AMF set in a single public land mobile network (PLMN). All AMF in the AMF set share context data for instance using an unstructured data storage function (UDSF). The apparatus further includes means for each S-NSSAI: in an instance where the number of UE allowed to access the network slice does not exceed a pre-defined limit on the network slice associated with the S-NSSAI stored in the shared context data, designating the S-NSSAI as an allowed S-NSSAI and incrementing a counter of number of UEs using the network slice associated with the S-NSSAI; and in an instance where the number of UE allowed to access the network slice exceeds a pre-defined limit on the network slice associated with the S-NSSAI stored in the shared context data, designating the S-NSSAI as a rejected S-NSSAI. The apparatus further includes means for causing transmission of a registration response message comprising the allowed S-NSSAIs or the list of rejected S-NSSAIs to the user equipment.

In another example embodiment, a computer program product is provided, the computer program product comprises at least one non-transitory computer-readable storage medium having computer executable program code instructions stored therein, the computer executable program code instructions comprising program code instructions configured, upon execution, to receive, from a user equipment (UE), a registration request message comprising requested Network Slice Selection Assistance Information (NSSAI) through an access network (AN). The requested NSSAI comprises one or more single-NSSAIs (S-NSSAIs) subject to a capping number of UEs allowed to access one or more network slices associated with the one or more S-NSSAIs. The computer executable program code instructions further include program code instructions configured, upon execution, to causing transmission of a service request message to a network slice selection function (NSSF). The service request message includes indications of the one or more S-NSSAIs. The computer executable program code instructions further include program code instructions configured, upon execution, to receive a service response from the network slice selection function. The service response comprises an allowed NSSAI that includes at least one of 1) one or more allowed S-NSSAIs or 2) a list of rejected S-NSSAIs due to a maximum number of UEs allowed to access the network slices associated with the one or more S-NSSAIs has been reached. The computer executable program code instructions further include program code instructions configured, upon execution, to cause transmission of a registration response message comprising at least one of 1) the one or more allowed S-NSSAIs or 2) the list of rejected S-NSSAIs due to the maximum number of UEs allowed to access the network slices associated with the one or more S-NSSAIs has been reached to the user equipment.

In some implementations of such a computer program product, the service response is dedicated to enforcement of the capping number of UEs per network slice. In some embodiments, the one or more S-NSSAIs are each associated with S-NSSAI subscription information that includes a flag indicating a need to perform a limitation of a number of subscribers or a limitation of a number of allowed UEs. In some embodiments, the service response or registration response message further comprises an indication indicating that rejected S-NSSAIs are caused by upper limit of UEs per slice reached and an optional backoff timer indicating a wait time before attempting another registration request message including the rejected S-NSSAIs in the list of rejected S-NSSAIs. In some embodiments, the computer executable program code instructions further include program code instructions configured, upon execution, to: determine that the UE is no longer using one or more S-NSSAIs of the one or more allowed S-NSSAIs. The determining is based on receiving a deregistration request from the user equipment or receiving a requested NSSAI in a new registration request message no longer including one or more of the S-NSSAIs subject to capping from a previous Allowed NSSAI; and causing transmission of a service request message comprising an indication that the UE is no longer using the one or more S-NSSAIs to cause the NSSF to decrement one or more counters of number of UEs using the Network Slice(s) for the one or more S-NSSAIs that are no longer used.

In another example embodiment, a computer program product is provided, the computer program product comprises at least one non-transitory computer-readable storage medium having computer executable program code instructions stored therein, the computer executable program code instructions comprising program code instructions configured, upon execution, to receive, at a network slice selection function (NSSF), a service request message comprising one or more single Network Slice Selection Assistance Information (S-NSSAIs) subject to a capping number of user equipments (UEs) allowed to access one or more network slices associated with the one or more S-NSSAIs from an access and mobility function (AMF). The computer executable program code instructions further include program code instructions configured, upon execution, to determine, by the NSSF, a current number of UEs allowed to access the one or more network slices associated with the one or more S-NSSAIs. The computer executable program code instructions further include program code instructions configured, upon execution, to for each S-NSSAI: in an instance where the number of UE allowed to access does not exceed a pre-defined limit on the maximum number of UEs using the network slice associated with the S-NSSAI, designate the S-NSSAI as an allowed S-NSSAI and increment a counter of number of UEs using the Network Slice associated with the S-NSSAI; and in an instance where the number of UE allowed to access the network slice exceeds a pre-defined limit on the network slice associated with the S-NSSAI, designate the S-NSSAI as a rejected S-NSSAI. The computer executable program code instructions further include program code instructions configured, upon execution, to cause transmission of a service response comprising an allowed NSSAI that includes at least one of 1) one or more allowed S-NSSAIs or 2) a list of rejected S-NSSAIs due to a maximum number of UEs allowed to access the network slices associated with the one or more S-NSSAIs has been reached.

In some implementations of such a computer program product, the NSSF is configured to decrement one or more counters of number of UEs using the one or more network slices associated with the one or more S-NSSAIs upon receiving an indication that the UE is no longer using the one or more S-NSSAIs. In some embodiments, the NSSF is configured by a visited public land mobile network based on a roaming agreement on a maximum number of UEs allowed per S-NSSAI for a home public land mobile network S-NSSAI. In some embodiments, the NSSF is configured based on a service level agreement. In some embodiments, the NSSF is a NSSF in a visited public land mobile network configured to interact with a NSSF of a home public land mobile network in an instance where the UE is roaming and a visited network detects that the UE inbound roamer is requesting or abandoning S-NSSAIs subject to capping and the counters of the current number of UEs allocated to access the network slice(s) are in the NSSF of the home public land mobile network. In some embodiments, the NSSF is configured to, in an instance where the number of UE allowed to access the Network Slice exceeds a pre-defined limit on the network slice associated with the S-NSSAI, alternatively designates the S-NSSAI as allowed S-NSSAI but with a specific charging fee.

In another example embodiment, a computer program product is provided, the computer program product comprises at least one non-transitory computer-readable storage medium having computer executable program code instructions stored therein, the computer executable program code instructions comprising program code instructions configured, upon execution, to receive, from a user equipment (UE), a registration request message comprising requested Network Slice Selection Assistance Information (NSSAI) through an access network (AN). The requested NSSAI comprises one or more single-NSSAIs (S-NSSAIs) subject to a capping number of UEs allowed to access one or more network slices associated with the one or more S-NSSAIs. Each of the one or more S-NSSAIs is supported by a single access and mobility function (AMF) or AMF set in a single public land mobile network (PLMN). All AMF in the AMF set share context data for instance using an unstructured data storage function (UDSF). The computer executable program code instructions further include program code instructions configured, upon execution, to for each S-NSSAI: in an instance where the number of UE allowed to access does not exceed a pre-defined limit on the network slice associated with the S-NSSAI stored in the shared context data, designate the S-NSSAI as an allowed S-NSSAI and increment a counter of number of UEs using the network slice associated with the S-NSSAI; and in an instance where the number of UE allowed to access the network slice exceeds a pre-defined limit on the network slice associated with the S-NSSAI stored in the shared context data, designating the S-NSSAI as a rejected S-NSSAI. The computer executable program code instructions further include program code instructions configured, upon execution, to cause transmission of a registration response message comprising the allowed S-NSSAIs or the list of rejected S-NSSAIs to the user equipment.

BRIEF DESCRIPTION OF THE DRAWINGS

Figure 1:
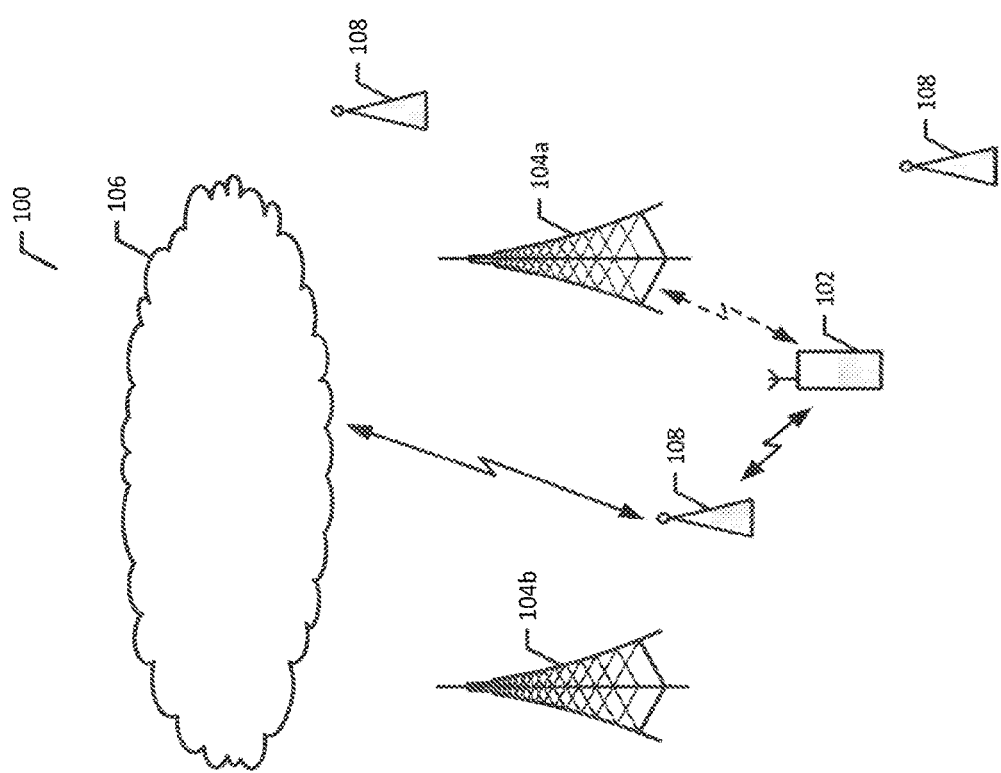
Figure 2:
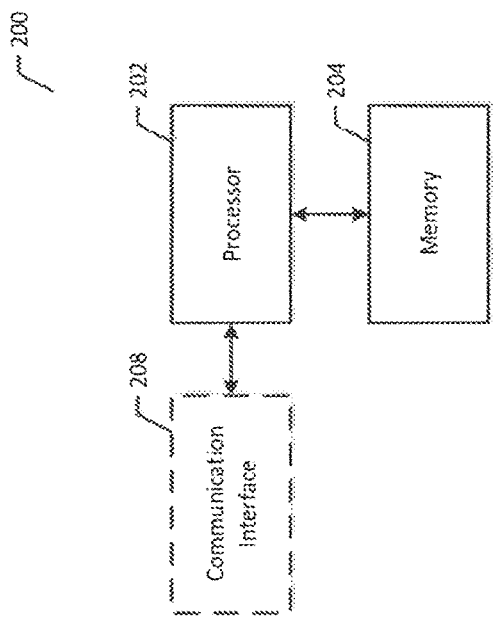
Figure 3:
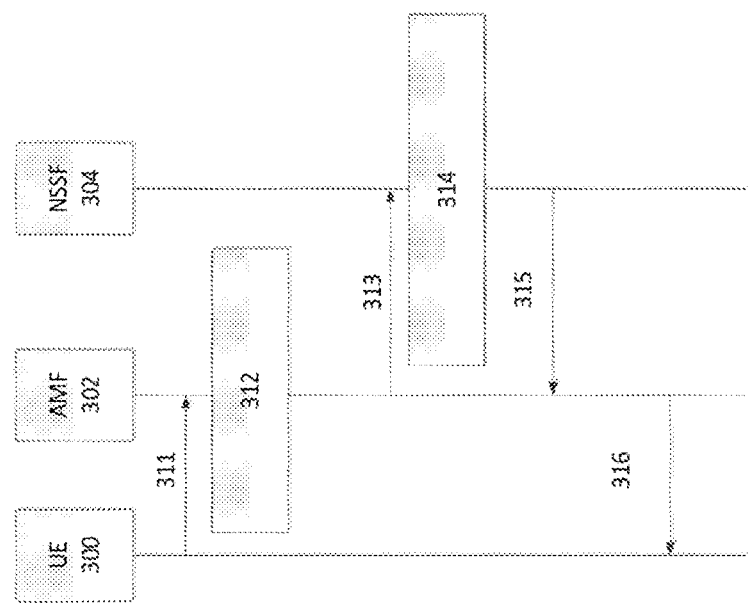
Figure 4:
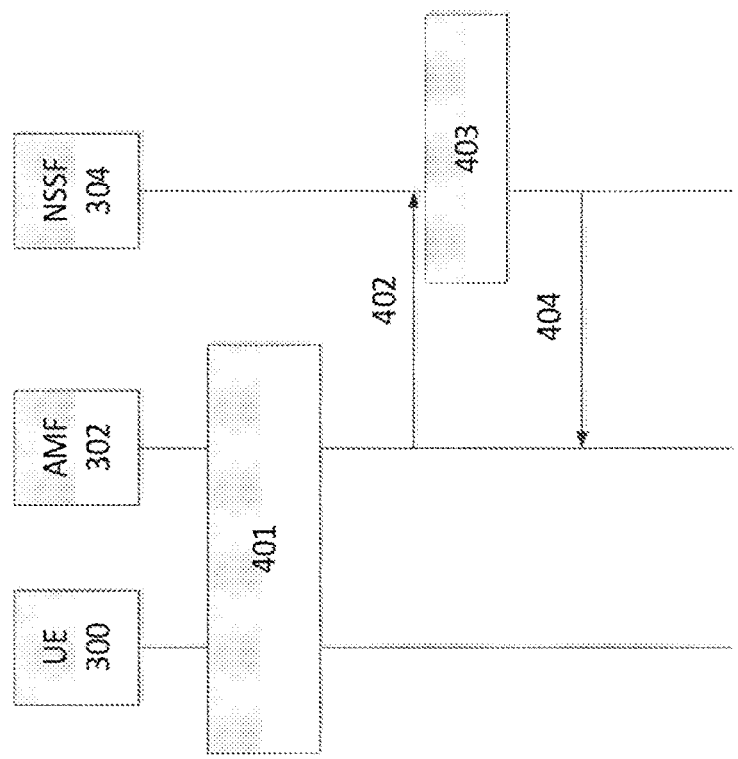
Figure 5:
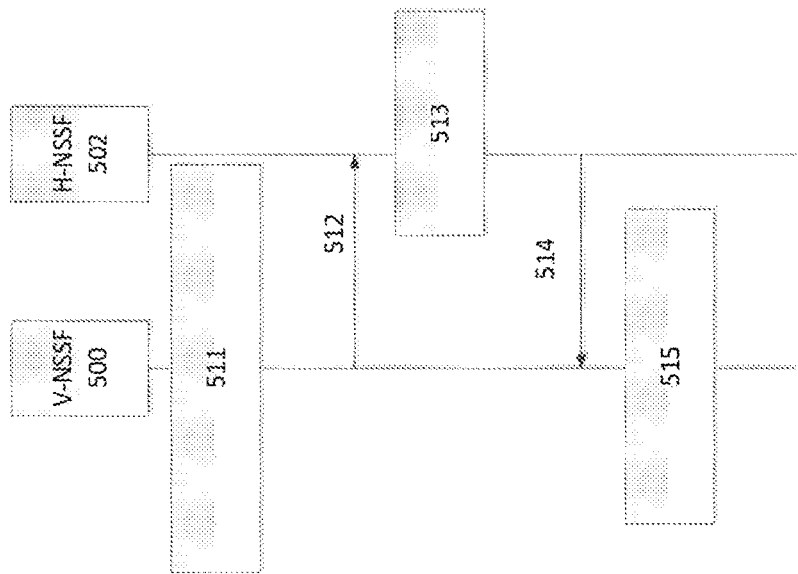

Having thus described certain example embodiments of the invention in general terms, reference will now be made to the accompanying drawings, which are not necessarily drawn to scale, and wherein:

FIG. 1 depicts an example system environment in which implementations in accordance with an example embodiment of the present invention may be performed;

FIG. 2 is a block diagram of a core network apparatus configured in accordance with an example embodiment of the present disclosure;

FIG. 3 illustrates example transmissions between a user equipment and a communication system in accordance with an example embodiment of the present disclosure;

FIG. 4 illustrates example transmissions between a user equipment and a communication system in accordance with an example embodiment of the present disclosure;

FIG. 5 illustrates example transmissions between a home Network Slice Selection Function (H-NSSF) and a visited Network Slice Selection Function (V-NSSF) in a communication system in accordance with an example embodiment of the present disclosure; and FIGS. 6A, 6B, 6C, and 6D are flowcharts illustrating workflows of various components of a communication system in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment to provide an enforcement mechanism for a maximum number of user equipment per network slice in a communication system.

FIG. 1 depicts an example communication system environment in which implementations in accordance with an example embodiment of the present invention may be performed. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with certain embodiments of the present invention. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, the system environment includes one or more user equipment (UE) 102 configured to communicate wirelessly, such as via an access network, with a network 106. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems. System environment 100, as depicted in FIG. 1, also includes one or more access points 104a and 104b, such as base stations, including but not limited to node Bs, evolved Node Bs (eNB), or the like. A cellular access point, such as a base station, may define and service one or more cells. The access points may, in turn, be in communication with a network 106, such as a core network via a gateway, such that the access points establish cellular radio access networks by which the user equipment 102 may communicate with the network. The system environment 100 of FIG. 1 may include a plurality of different cellular radio access cells and/or networks or parts of such networks including, for example, a 5G radio access network, an LTE (Long-Term Evolution) radio access network, a UMTS (universal mobile telecommunications system) radio access network, etc. In some example implementations, equipment and other infrastructure associated with multiple different cellular radio access networks may be located at or near structures and/or other equipment associated with a particular access point, such as access point 104a and 104b.

In some implementations of system environment 100, the cellular radio access networks serviced by access points 104a, 104b, and any other access points in a given area are identical, in the sense that as user equipment 102 moves from an area serviced by access point 104a to an area serviced by access point 104b, the user equipment 102 is able to access the network 106 via a radio access network provided across access points. Although not shown, the system may also include a controller associated with one or more of the cellular access points, such as base stations, for example, so as to facilitate operation of the access points and management of the user equipment 102 in communication therewith. As shown in FIG. 1, a system may also include one or more wireless local area networks (WLANs), each of which may be serviced by a WLAN access point 108 configured to establish wireless communications with the user equipment. As such, the user equipment may communicate with the network via a WLAN access point as shown in solid lines in FIG. 1, or, alternatively, via a cellular access point as shown in dashed lines. The radio access networks as well as the core networks may consist of additional network elements as routers, switches, servers, gateways, and/or controllers.

In this regard, the implementation and/or allocation of a network slice within a network environment can be accomplished by an apparatus 200 as depicted in FIG. 2. The apparatus may be embodied by and/or incorporated into one or more UEs, such as user equipment 102, or any of the other devices discussed with respect to FIG. 1, such as access points 104a and/or 104b, one or more of WLAN access points 108, and/or devices that may be incorporated or otherwise associated with system environment 100. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, including but not limited to a smartphone, a tablet computer, or the like, for example.

In some embodiments, the system environment 100 may include one or more of the following network functions (NF): Authentication Server Function (AUSF), Access and Mobility Management Function (AMF), Data Network (DN), e.g. operator services, Internet access or 3rd party services, Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), UE radio Capability Management Function (UCMF), Application Function (AF), User Equipment (UE), Next Generation-Radio Access Network (NG-RAN), 5G-Equipment Identity Register (5G-EIR), Network Data Analytics Function (NWDAF), and Charging Function (CHF). The system environment may further comprise the following network entities: Service Communication Proxy (SCP) and Security Edge Protection Proxy (SEPP).

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means including processing circuitry, such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 may optionally include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

On a high level, in some embodiments, when a UE registers with an AMF, the AMF checks whether the Requested Network Slice Selection Assistance Information (NSSAI) is the current allowed NSSAI. If the Requested NSSAI is the current allowed NSSAI, the AMF may not need to take any action. If the UE requests a NSSAI that is not the current allowed NSSAI (e.g., fewer or more or totally different S-NSSAIs are requested), the AMF would attempt to determine the Allowed NSSAI and associated restrictions on accessing the S-NSSAIs that the related network slices need and then enforce such restrictions.

FIG. 3 illustrates example transmissions between a user equipment and a communication system for registering a user equipment in accordance with an example embodiment of the present disclosure. As illustrated in FIG. 3, at operation 311, UE 300 registers and indicates requested NSSAI to the AMF 302. At least one Single-NSSAI (S-NSSAI) in the Requested NSSAI is new or different and subject to capping of UEs per slice.

At operation 312, AMF 302 attempts to retrieve the subscription information that may indicate subscribed NSSAIs related to slices that are subject to the limitation of the number of UEs per slice. In some embodiments, as illustrated in operation 313, the AMF 302 retrieves the Allowed NS SAI by transmitting an Nnssf_Selection_get or other service request message related or dedicated to enforcement of the capping number of UEs per slice (e.g., capping number of UEs allowed to access a network slice) which may include information about the requested NSSAIs and flags indicating capping required to the NSSF 304.

At operation 314, the NSSF 304 increments or otherwise updates one or more counters for S-NSSAIs that have been requested, subject to the capping number of UEs per slice, and currently do not have maximum number of UEs accessing the network slice associated with the N-SSAI. In an example embodiment, some S-NSSAIs in the requested NSSAI are subject to capping based on checking subscription data; thus NSSF interaction may be invoked. In some embodiments, the NSSF 304 can be provided the cap value from subscription data if any is available. In some embodiments, the NSSF 304 may be configured with the number of UEs allowed per S-NSSAI subject to capping. By receiving the service request message from the AMF 302, the NSSF is given an indication of which S-NSSAIs the UE is joining which are subject to counting and capping.

The NSSF 304 is configured to increment or otherwise update counters for all applicable S-NSSAIs and if any S-NSSAI equals or exceeds the limit of UEs on the network slice associated with the NSSAI, the NSSF excludes the S-NSSAI from the allowed NSSAI. At operation 315, the NSSF 304 transmits an Nnssf_Selection_get_Response or other service response related or dedicated to enforcement of the capping number of UEs per slice. The service response may include the Allowed NSSAI and if an S-NSSAI is rejected due to the number of user equipment reached for the S-NSSAI, an indication that such S-NSSAI is rejected due to the fact the maximum number of UEs for the slice has been reached. The service response may optionally include a back-off timer for each of the rejected S-NSSAIs with the back-off timer preventing a rejected S-NSSAI from submitting another request until the back-off timer has expired.

At operation 316, the AMF 302 transmits the allowed NSSAI and any rejected S-NSSAI(s) with a cause code related to capping and any backoff timer to the UE 300. In some embodiments, the AMF 302 transmits a Registration ACCEPT message that includes the allowed NSSAI, optionally any rejected S-NSSAIs due to maximum number of UEs being reached, and the optional back-off timer for each of these S-NSSAIs. In some embodiments, the AMF 302 transmits a Registration REJECT message that includes rejected S-NSSAIs due to the maximum number of UEs being reached.

In some embodiments, some S-NSSAIs in a previously allowed NSSAI for a UE are missing from the requested NSSAI in a new registration request. For example, The UE need no longer use the network slice related to such S-NSSAIs. The S-NSSAIs that are subject to capping need to be reported to NSSF 304 by the AMF 302. Therefore, in operation 313, the AMF 302 would include an indication of S-NSSAIs with capping required that the UE is no longer using in the service request message. Accordingly, the NSSF 304 is given an explicit indication about S-NSSAI(s) subject to capping that have been abandoned. At operation 314, NSSF 304 decrements or otherwise updates counters as needed for the S-NSSAI(s) that have been abandoned. At operation 315, NSSF 304 provides the allowed NSSAI to the AMF 302. The registration may then be accepted by the AMF 302 by transmitting a registration accept with the allowed NSSAI to the UE 300 at operation 316.

Turning now to FIG. 4, FIG. 4 illustrates example transmissions between a user equipment and a communication system for deregistering a user equipment in accordance with an example embodiment of the present disclosure.

At operation 401, the UE 300 deregisters where at least one S-NSSAI that is subject to capping of UEs per slice is in the current allowed NSSAI for the UE 300. At operation 402, the AMF 302 transmits an Nnssf_Selection_get or other service request message dedicated to the per slice number of UEs capping to the NSSF 304, The service request message may include an indication of S-NSSAIs with capping required that the UE is no longer using. At operation 403, the NSSF 304 decrements or otherwise updates counter for S-NSSAIs that have been abandoned and are subject to capping. At operation 404, the NSSF 304 transmits an Nnssf_Selection_get_Response or other service response related or dedicated to enforcement of the capping number of UEs per slice as acknowledgement.

Turning now to FIG. 5, example transmissions are illustrated between a home NSSF and a visited NSSF in a communication system in accordance with an example embodiment of the present disclosure. In roaming cases, the NSSF of the visited Public Land Mobile Network (VPLMN) can be configured per S-NSSAI of home Public Land Mobile Network (HPLMN) to report to the HPLMN NSSF when a user joins or leaves the S-NSSAI. In some embodiments, the NSSF of the VPLMN is provided by the AMF that provides a flag per S-NSSAI that indicates whether the S-NSSAI of the H-PLMN requires enforcement of the upper limit on the number of UEs. The HPLMN NSSF may control the maximum number per H-PLMN S-NSSAIs based on the flags. If an upper limit is reached; then the H-PLMN NSSF responds to the VPLMN NSSF that the upper limit is reached and the NSSF may then provide an indication to the AMF similar to the non-roaming embodiment illustrated in FIG. 3.

If the S-NSSAI is only supported by a single AMF set in a serving PLMN (e.g. no roaming supported for the slice and the PLMN supports the S-NSSAI in a single AMF set), and if these AMFs share their context data e.g. using a UDSF, then the NSSF support is not needed for this feature to work and the limit can be provisioned in the UDSF and enforced by the AMFs directly. AMFs from this AMF set however will provide the same information to the UEs that are subject to a restriction of use of an S-NSSAI.

In some other embodiments involving roaming, the VPLMN has the ability to get their NSSF configured based on a roaming agreement on the number of UEs admitted per H-PLMN S-NSSAI value. In this embodiment, the H-PLMN can provide all PLMNs with quotas that may also be subject to a service level agreement (SLA) with the H-PLMN customers. A particular case is the support of the operators' outbound roamers.

As illustrated in block 511, the V-NSSF 500 receives a message from an AMF that causes incrementing or decrementing of the UE count to a certain S-NSSAI subject to capping. The AMF detects that certain S-NSSAIs are subject to capping and causes the addition or removal of a UE to the UE counters for these slices. The S-NSSAI of the HPLMN for these slices of the VPLMN may be marked as requiring reporting to the H-PLMN. In some embodiments, the S-NSSAI is not marked but the requirement may be implicit based on that the occurrence of counting and the H-PLMN S-NSSAI is included in the interaction with the NSSF.

The V-NSSF is configured to report or be triggered to report the H-PLMN NSSF additions/removal of a UE to certain S-NSSAIs for certain S-NSSAIs of the HPLMN. As shown in block 512, the V-NSSF transmits a service request message related or dedicated to enforcement of the capping number of UEs per slice. The service request message may include an indication of HPLMNS-NSSAIs with capping which required that a UE is no longer using the S-NSSAI or just begin to use the S-NSSAI. As shown in block 513, the H-NSSF 502 decrements or increments counter for HPLMN S-NSSAIs that have been abandoned or joined, respectively, and are subject to capping. In some embodiments, as shown in 514, the H-NSSF 502 transmits an NSSF service response related or dedicated to enforcement of the capping number of UEs per slice to the V-NSSF 500. The NSSF service response may serve as an acknowledgement and may include any action of HPLMN S-NSSAIs that have reached limit and any backoff timer. Upon receiving the NSSF service response, the V-NSSF interacts with the AMF to cause certain HPLMN S-NSSAI(S) and related VPLMN S-NSSAIs indicated in mapping information to be rejected. The V-NSSF may also transmit an indication of capping and any available backoff timer.

Figure 6A:
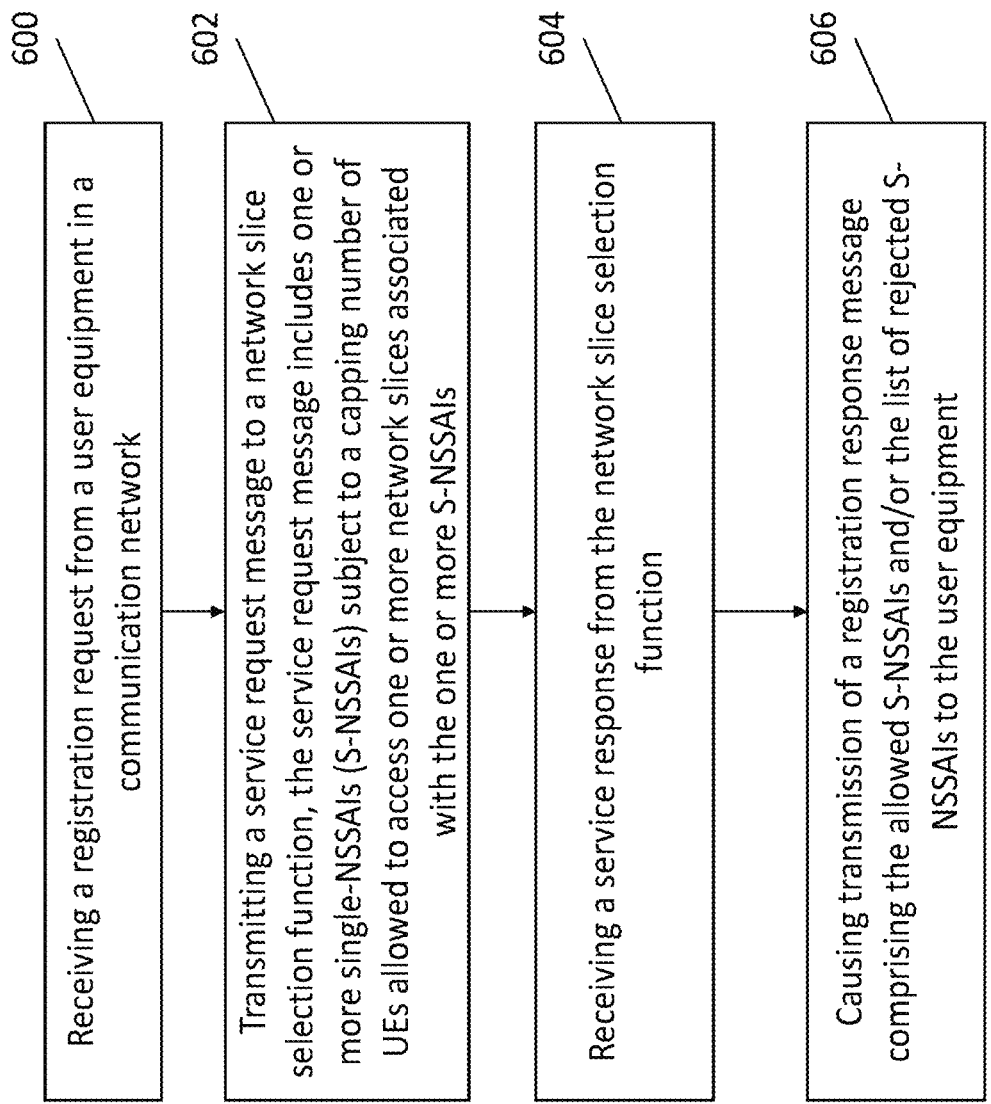

Referring now to FIGS. 6A, 6B, 6C, and 6D, workflows of various components of a communication system are illustrated in accordance with an example embodiment, such as an AMF, a NSSF, and/or a V-NSSF previously described in conjunction with FIGS. 3, 4, and 5. Referring now to FIG. 6A, at block 600, the AMF includes means, such as the processor 202 and communication interface 208, for receiving a registration request from a user equipment in a communication network. The registration request includes a requested Network Slice Selection Assistance Information (NSSAI). In some embodiments, the requested NSSAI includes one or more S-NSSAIs subject to capping of UEs per slice. In some embodiments, the one or more S-NSSAIs are each associated with S-NSSAI subscription information that includes a flag indicating a need to perform a limitation of a number of subscribers or a limitation of a number of allowed UEs. The NSSAI, S-NSSAI, and AMF may be the NSSAI, S-NSSAI, and AMF previously described in conjunction with FIG. 3.

At block 602, the AMF includes means, such as the processor 202 and communication interface 208, for causing transmission of a service request message to a network slice selection function. The service request message may be related or dedicated to enforcement of capping number of user equipment per network slice. The service request message may include the requested NSSAIs and optionally one or more flags indicating that capping is required for one or more S-NSSAIs subject to capping of UEs per slice. The NSSF may be configured to decrement or otherwise update the counter for the one or more S-NSSAIs subject to capping of UEs per slice requested that are, in fact, subject to capping. In some embodiments, transmission of the service request message is triggered by a flag indicating that at least one of the one or more S-NSSAIs is mapped to a S-NSSAI of a home public land mobile network. The service request message may be the service request message previously described in conjunction with FIG. 3.

At block 604, the AMF includes means, such as the processor 202 and communication interface 208, for receiving a service response from the network slice selection function. In some embodiments, the service response includes at least one of 1) the one or more allowed S-NSSAIs or 2) the list of rejected S-NSSAIs due to the maximum number of UEs allowed to access the network slices associated with the one or more S-NSSAIs has been reached to the user equipment. The service response may be the service response previously described in conjunction with FIG. 3. The service response may include the allowed NSSAI and may be dedicated to enforcement of the capping number of UEs per slice. The service response may also include the number of UEs already supported for the allowed S-NSSAIs and an optional back-off timer for each of the rejected S-NSSAIs. The NSSF is configured to determine the number of UEs accessing the one or more network slices associated with the one or more S-NSSAIs. For each S-NSSAI, in an instance where the number of UEs accessing the network slice equals or exceeds a pre-defined limit on the network slice associated with the S-NSSAI, the S-NSSAI is excluded from the allowed S-NSSAIs. The S-NSSAIs that are excluded from the allowed S-NSSAIs are designated as rejected NSSAIs. The NSSF increments or otherwise updates counters for all S-NSSAIs that are not excluded from the allowed NSSAIs.

At block 606, the AMF includes means, such as the processor 202 and communication interface 208, for causing transmission of a registration response message to the user equipment. The registration response message may include at least one of 1) one or more allowed S-NSSAIs or 2) a list of rejected S-NSSAIs due to a maximum number of UEs allowed to access the network slices associated with the one or more S-NSSAIs has been reached. The registration response message may be a registration ACCEPT message that includes the allowed S-NSSAIs. The registration accept message may optionally include one or more rejected S-NSSAIs. If all of the requested S-NSSAIs are rejected, the registration response message may be a registration REJECT message. The registration ACCEPT message and registration REJECT message may be the registration ACCEPT message and registration REJECT message, respectively, previously described in conjunction with FIG. 3. In some embodiments, the registration response message further comprises one or more cause codes indicating one or more rejections associated with the list of rejected S-NSSAIs that are caused by the upper limit of UEs per slice having been reached and an optional backoff timer indicating a wait time before attempting another registration request message including the rejected S-NSSAIs in the list of rejected S-NSSAIs.

Figure 6B:
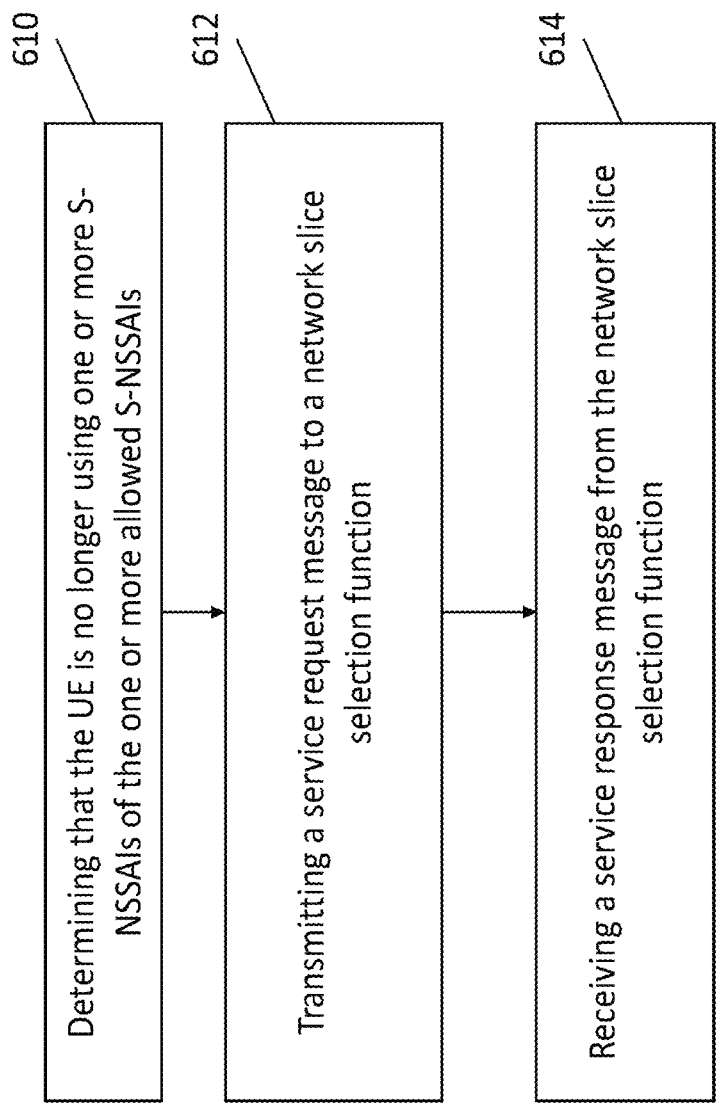

Referring now to FIG. 6B, at block 610, the AMF includes means, such as the processor 202 or the like, for determining that the UE is no longer using one or more S-NSSAIs of the one or more allowed S-NSSAIs. The determination is based on deregistration of the UE or an update in the requested NSSAI that excluded the one or more S-NSSAIs that the UE is no longer using one or more S-NSSAIs of the one or more allowed S-NSSAIs.

At block 612, the AMF includes means, such as the processor 202 and communication interface 208, for causing transmission of a service request message to a network slice selection function. The service request message includes an indication that the user equipment is no longer using the one or more of the allowed S-NSSAIs and may cause the NSSF to decrement one or more counters associated with the one or more S-NSSAIs after deregistering the UE. The service request message may be the service request message previously described in conjunction with FIGS. 3 to 5.

At block 614, the AMF includes means, such as the processor 202 and communication interface 208, for receiving a service response message from the network slice selection function. The service response message may be dedicated to enforcement of the capping number of UEs per slice and may serve as an acknowledgment. The service response message may be the service response message previously described in conjunction with FIGS. 3 to 5.

Figure 6C:
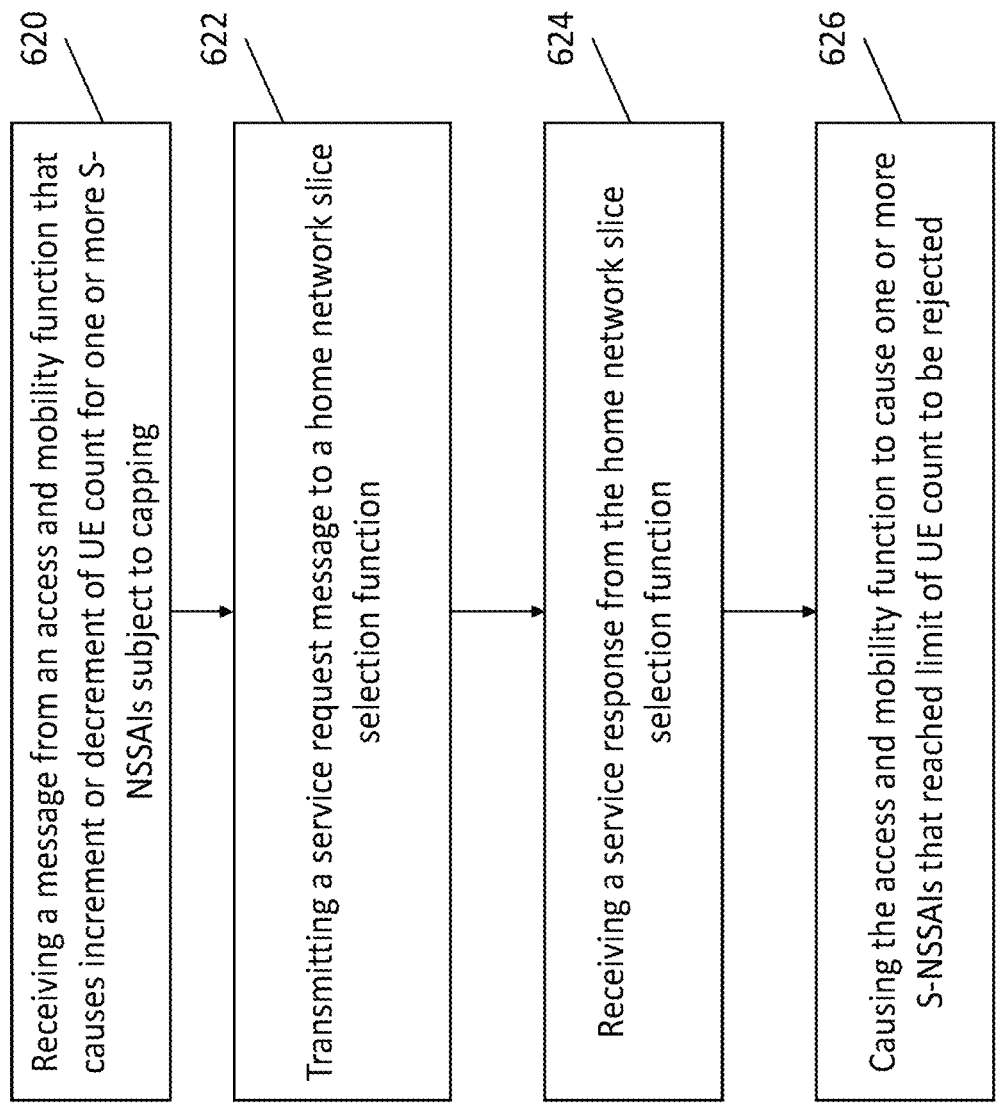

Referring now to FIG. 6C, at block 620, the V-NSSF includes means, such as the processor 202 and communication interface 208, for receiving a message from an access and mobility function that causes the incrementing or decrementing of the UE count for one or more S-NSSAIs subject to capping. The message may be the message from AMF previously described in conjunction with FIG. 5.

The V-NSSF is configured to report or be triggered to report the H-PLMN NSSF additions/removal of a UE to certain S-NSSAIs for certain S-NSSAIs of the HPLMN. At block 622, the V-NSSF includes means, such as the processor 202 and communication interface 208, for transmitting a service request message to a home network slice selection function. The service request message may be the service request message previously described in conjunction with FIG. 5. The service request message may be related or dedicated to enforcement of the capping number of UEs per slice. The service request message may include an indication of HPLMN-NSSAIs with capping which required that a UE is no longer using the S-NSSAI or just beginning to use the S-NSSAI. The H-NSSF may decrement or increment the counter for the HPLMN S-NSSAIs that have been abandoned or joined, respectively, and are subject to capping.

At block 624, the V-NSSF includes means, such as the processor 202 and communication interface 208, for receiving a service response message from the home network slice selection function. The service response may be the service response previously described in conjunction with FIG. 5. The service response is related or dedicated to enforcement of the capping number of UEs per slice. The NSSF service response may serve as an acknowledgement and may include any action of the HPLMN S-NSSAIs that have reached the limit or cap and any backoff timer. Upon receiving the NSSF service response, the V-NSSF interacts with the AMF to cause certain HPLMN S-NSSAI(S) and related VPLMN S-NSSAIs indicated in mapping information to be rejected. The V-NSSF may also transmit an indication of capping and any available backoff timer.

At block 626, the V-NSSF includes means, such as the processor 202 and communication interface 208, for causing the access and mobility function to cause one or more S-NSSAIs (HPLMN S-NSSAIs and related VPLMN S-NSSAIs indicated in mapping information to be rejected) that reached the limit or cap of the UE count to be rejected access when a UE requests the one or more S-NSSAIs that reached limit of UE count. The NSSF service response may serve as an acknowledgement and may include any action of the HPLMN S-NSSAIs that have reached the limit or cap and any backoff timer. The V-NSSF may also transmit indication of capping and any available backoff timer.

Figure 6D:
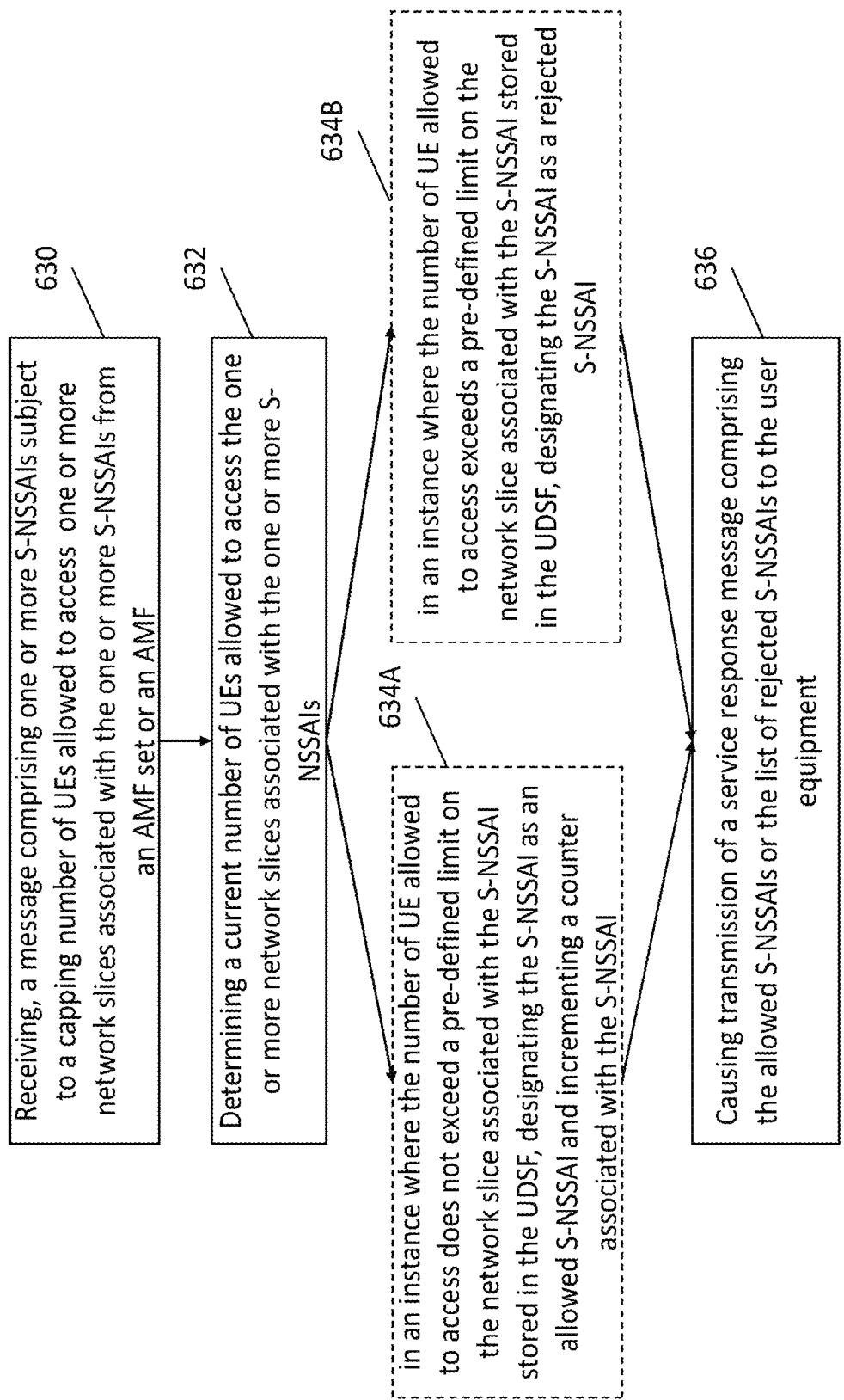

Referring now to FIG. 6D, at block 630, the NSSF includes means, such as the processor 202 and communication interface 208, for receiving a service request message comprising one or more single Network Slice Selection Assistance Information (S-NSSAIs) subject to a capping number of user equipments (UEs) allowed to access one or more network slices associated with the one or more S-NSSAIs from an access and mobility function (AMF).

The service request message may be dedicated to enforcement of the capping number of UEs per slice and may serve as an acknowledgment. In some embodiments, the service request message may be the service request message previously described in conjunction with FIGS. 3 to 5.

At block 632, the NSSF includes means, such as the processor 202 or the like, for determining a current number of UEs allowed to access the one or more network slices associated with the one or more S-NSSAIs. The determination may be performed by retrieving data regarding a current number of UEs allowed to access the one or more network slices associated with the one or more S-NSSAIs.

At block 634A, the NSSF includes means, such as the processor 202, for designating the S-NSSAI as an allowed S-NSSAI and incrementing a counter associated with the S-NSSAI in an instance where the number of UE allowed access does not exceed a pre-defined limit on the network slice associated with the S-NSSAI for each of the S-NSSAIs. Note that blocks 634A, 634B, and 636 are not dependent on block 632 and may be triggered in other instances, such as the instance where the NSSF receives information indicating one or more single Network Slice Selection Assistance Information (S-NSSAIs) subject to a capping number of user equipments (UEs) allowed to access one or more network slices associated with the one or more S-NSSAIs.

At block 634B, the NSSF includes means, such as the processor 202, for designating the S-NSSAI as a rejected S-NSSAI in an instance where the number of UE allowed to access exceeds a pre-defined limit on the network slice associated with the S-NSSAI for each of the S-NSSAIs.

At block 636, the NSSF includes means, such as the processor 202 and communication interface 208, for causing transmission of a service response comprising at least one of 1) one or more allowed S-NSSAIs or 2) a list of rejected S-NSSAIs due to a maximum number of UEs allowed to access the network slices associated with the one or more S-NSSAIs has been reached. In some embodiments, the service response message may be the service response message previously described in conjunction with FIGS. 3 to 5. In some embodiments, the NSSF further includes means for and is configured to decrement one or more counters associated with the one or more S-NSSAIs upon receiving an indication that the UE is no longer using the one or more S-NSSAIs.

In some embodiments, the NSSF is configured by a visited public land mobile network based on a roaming agreement on a maximum number of UEs allowed per S-NSSAI for a home public land mobile network S-NSSAI. In such roaming cases, the NSSF of a visited Public Land Mobile Network (VPLMN) can be configured per S-NSSAI of home Public Land Mobile Network (HPLMN) to report to the HPLMN NSSF when a user equipment joins or leaves the S-NSSAI. In some embodiments, the NSSF of VPLMN is provided by the AMF that provides a flag per S-NSSAI that indicates whether the S-NSSAI of H-PLMN requires enforcement of the upper limit on the UEs. The HPLMN NSSF may control the maximum number per H-PLMN S-NSSAIs based on the flags. If an upper limit is reached; then the H-PLMN NSSF responds to the VPLMN NSSF that the upper limit is reached and the NSSF may then indicate this state to the AMF. In some embodiments, the V-PLMN has the ability to obtain configuration of their NSSF based on a roaming agreement on the number of UEs admitted per H-PLMN S-NSSAI value. The H-PLMN of an example embodiment can provide all PLMNs with quotas that may also be subject to a service level agreement (SLA) with the H-PLMN customers. The V-PLMN may also provide quotas to HPLMN roaming partners.

In some embodiments, the NSSF is configured based on a service level agreement where different thresholds for charging are indicated in the SLA. For example, for the first X subscribers a certain fee applies, with other fees applicable for additional numbers of subscribers.

In some embodiments where the one or more S-NSSAIs is supported by a single access and mobility function (AMF) set in a single public land mobile network (PLMN) and where all AMF in the AMF set share a unstructured data storage function (UDSF), the AMF may include means for performing the functions of blocks 634A and 634B and then generating transmission of a registration response message comprising the allowed S-NSSAIs and/or the list of one or more rejected S-NSSAIs to the user equipment. As such, the method, apparatus and compute program product of an example embodiment provide an enforcement mechanism for the maximum number of user equipment per network slice in a communication system.

As described above, FIGS. 6A, 6B, 6C, and 6D are flowcharts of an apparatus 200, method, and computer program product according to an example embodiment of the disclosure. It will be understood that each block of the flowchart, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present disclosure and executed by a processor 202 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 3. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
receiving, from a user equipment (UE), a registration request message comprising requested Network Slice Selection Assistance Information (NSSAI) through an access network (AN), wherein the requested NSSAI comprises single-NSSAIs (S-NSSAIs) subject to a capping number of UEs allowed to access one or more network slices associated with the S-NSSAIs;
causing transmission of a service request message to a network slice selection function (NSSF), wherein the service request message includes indications of the S-NSSAIs;
receiving a service response from the network slice selection function, wherein the service response comprises an allowed NSSAI that includes a first plurality of allowed S-NSSAIs and a list of rejected S-NSSAIs due to a maximum number of UEs allowed to access the network slices associated with the one or more S-NSSAIs has been reached;
causing transmission of a registration response message comprising the first plurality of allowed S-NSSAIs and the list of rejected S-NSSAIs due to the maximum number of UEs allowed to access the network slices associated with the one or more S-NSSAIs has been reached to the user equipment, the registration response message further cause codes indicating one or more rejections associated with the list of rejected S-NSSAIs that are caused by the upper limit of UEs per slice having been reached and a backoff timer indicating a wait time before attempting another registration request message including the rejected S-NSSAIs in the list of rejected S-NSSAIs;
receiving, from the UE, a second registration request message comprising the requested NSSAI through the AN;
receiving a second service response from the network slice selection function, wherein the service response comprises a second plurality of allowed S-NSSAIs, wherein one or more S-NSSAIs in the first plurality of allowed NSSAI are missing from the requested NSSAI in second registration request based on the UE no longer using a network slice related to the missing 5-NSSAIs;
after registering the UE with one of the S-NSSAIs from the second plurality of S-NSSAIs, determining that the UE is no longer using the one of the S-NSSAIs based on an update in the NSSAI that excluded the one of the S-NSSAIs that the UE is no longer using;
based on the determining, causing the UE to be deregistered; and
after the UE is deregistered, causing the NSSF to decrement one or more counters associated with the one of the S-NSSAIs.

2. A method according to claim 1 wherein the service response is dedicated to enforcement of the capping number of UEs per network slice.

3. A method according to claim 2 wherein the one or more S-NSSAIs are each associated with S-NSSAI subscription information that includes a flag indicating a need to perform a limitation of a number of subscribers or a limitation of a number of allowed UEs.

4. A method according to claim 1 wherein the second service response comprises an indication indicating that rejected S-NSSAIs are caused by upper limit of UEs per slice reached and an optional backoff timer indicating a wait time before attempting another registration request message including the rejected S-NSSAIs in the list of rejected S-NSSAIs.

5. A method comprising:
receiving, at a network slice selection function (NSSF), a service request message comprising one or more single Network Slice Selection Assistance Information (S-NSSAIs) subject to a capping number of user equipments (UEs) allowed to access one or more network slices associated with the one or more S-NSSAIs from an access and mobility function (AMF);
determining, by the NSSF, a current number of UEs allowed to access the one or more network slices associated with the one or more S-NSSAIs;
for each S-NSSAI:
in an instance where the number of UE allowed to access does not exceed a pre-defined limit on the maximum number of UEs using the network slice associated with the S-NSSAI, designating the S-NSSAI as an allowed S-NSSAI and incrementing a counter of number of UEs using the Network Slice associated with the S-NSSAI;
in an instance where the number of UE allowed to access the network slice exceeds a pre-defined limit on the network slice associated with the S-NSSAI, designating the S-NSSAI as a rejected S-NSSAI; and
causing transmission of a service response comprising an allowed NSSAI that includes a first plurality of allowed S-NSSAIs and a list of rejected S-NSSAIs due to a maximum number of UEs allowed to access the network slices associated with the one or more S-NSSAIs has been reached;
causing transmission of a registration response message comprising the first plurality of allowed S-NSSAIs and the list of rejected S-NSSAIs due to the maximum number of UEs allowed to access the network slices associated with the one or more S-NSSAIs has been reached to the user equipment, the registration response message further cause codes indicating one or more rejections associated with the list of rejected S-NSSAIs that are caused by the upper limit of UEs per slice having been reached and a backoff timer indicating a wait time before attempting another registration request message including the rejected S-NSSAIs in the list of rejected S-NSSAIs;
receiving a second registration request message comprising the requested NSSAI through the AN;
receiving a second service response from the network slice selection function, wherein the service response comprises a second plurality of allowed S-NSSAIs, wherein one or more S-NSSAIs in the first plurality of allowed NSSAI are missing from the requested NSSAI in second registration request based on the UE no longer using a network slice related to the missing S-NSSAIs;
after registering the UE with one of the S-NSSAIs from the second plurality of S-NSSAIs, determining that the UE is no longer using the one of the S-NSSAIs based on an update in the NSSAI that excluded the one of the S-NSSAIs that the UE is no longer using;
based on the determining, causing the UE to be deregistered; and
after the UE is deregistered, causing the NSSF to decrement one or more counters associated with the one of the S-NSSAIs.

6. A method according to claim 5 wherein the NSSF is configured to decrement one or more counters of number of UEs using the one or more network slices associated with the first plurality of S-NSSAIs upon receiving an indication that the UE is no longer using the one of the S-NSSAIs.

7. A method according to claim 6 wherein the NSSF is configured by a visited public land mobile network based on a roaming agreement on a maximum number of UEs allowed per S-NSSAI for a home public land mobile network S-NSSAI.

8. A method according to claim 7 wherein the NSSF is configured based on a service level agreement.

9. A method according to claim 8 wherein the NSSF is a NSSF in a visited public land mobile network configured to interact with a NSSF of a home public land mobile network in an instance where the UE is roaming and a visited network detects that the UE inbound roamer is requesting or abandoning S-NSSAIs subject to capping and the counters of the current number of UEs allocated to access the network slice(s) are in the NSSF of the home public land mobile network.

10. A method according to claim 9 wherein the NSSF is configured to, in an instance where the number of UE allowed to access the Network Slice exceeds a pre-defined limit on the network slice associated with the S-NSSAI, alternatively designates the S-NSSAI as allowed S-NSSAI but with a specific charging fee.

11. A method comprising:
receiving, from a user equipment (UE), a registration request message comprising requested Network Slice Selection Assistance Information (NSSAI) through an access network (AN), wherein the requested NSSAI comprises one or more single-NSSAIs (S-NSSAIs) subject to a capping number of UEs allowed to access one or more network slices associated with the one or more S-NSSAIs, wherein each of the one or more S-NSSAIs is supported by a single access and mobility function (AMF) or AMF set in a single public land mobile network (PLMN), and wherein all AMF in the AMF set share context data for instance using an unstructured data storage function (UDSF);
for each S-NSSAI:
in an instance where the number of UE allowed to access the network slice does not exceed a pre-defined limit on the network slice associated with the S-NSSAI stored in the shared context data, designating the S-NSSAI as an allowed S-NSSAI and incrementing a counter of number of UEs using the network slice associated with the S-NSSAI; and
in an instance where the number of UE allowed to access the network slice exceeds a pre-defined limit on the network slice associated with the S-NSSAI stored in the shared context data, designating the S-NSSAI as a rejected S-NSSAI; and
causing transmission of a registration response message comprising a first plurality of allowed S-NSSAIs and a list of rejected S-NSSAIs to the UE;
causing transmission of a registration response message comprising the first plurality of allowed S-NSSAIs and the list of rejected S-NSSAIs due to the maximum number of UEs allowed to access the network slices associated with the one or more S-NSSAIs has been reached to the user equipment, the registration response message further cause codes indicating one or more rejections associated with the list of rejected S-NSSAIs that are caused by the upper limit of UEs per slice having been reached and a backoff timer indicating a wait time before attempting another registration request message including the rejected S-NSSAIs in the list of rejected S-NSSAIs;

receiving a second registration request message comprising the requested NSSAI through the AN;

receiving a second service response from the network slice selection function, wherein the service response comprises a second plurality of allowed S-NSSAIs, wherein one or more S-NSSAIs in the first plurality of allowed NSSAI are missing from the requested NSSAI in second registration request based on the UE no longer using a network slice related to the missing S-NSSAIs;

after registering the UE with one of the S-NSSAIs from the second plurality of S-NSSAIs, determining that the UE is no longer using the one of the S-NSSAIs based on an update in the NSSAI that excluded the one of the S-NSSAIs that the UE is no longer using;

based on the determining, causing the UE to be deregistered; and after the UE is deregistered, causing the NSSF to decrement one or more counters associated with the one of the S-NSSAIs.

12. An apparatus comprising at least one processor and at least one memory including computer program code for one or more programs, the at least one memory and the computer program code configured to, with the at least one processor, cause the apparatus at least to:

receive, from a user equipment (UE), a registration request message comprising requested Network Slice Selection Assistance Information (NSSAI) through an access network (AN), wherein the requested NSSAI comprises one or more single-NSSAIs (S-NSSAIs) subject to a capping number of UEs allowed to access one or more network slices associated with the one or more S-NSSAIs;

cause transmission of a service request message to a network slice selection function (NSSF), wherein the service request message includes indications of the one or more S-NSSAIs; receive a service response from the network slice selection function, wherein the service response comprises an allowed NSSAI that includes a first plurality of allowed S-NSSAIs and a list of rejected S-NSSAIs due to a maximum number of UEs allowed to access the network slices associated with the one or more S-NSSAIs has been reached; and cause transmission of a registration response message comprising the first plurality of the allowed S-NSSAIs and the list of rejected S-NSSAIs due to the maximum number of UEs allowed to access the network slices associated with the one or more S-NSSAIs has been reached to the user equipment, the registration response message further cause codes indicating one or more rejections associated with the list of rejected S-NSSAIs that are caused by the upper limit of UEs per slice having been reached and a backoff timer indicating a wait time before attempting another registration request message including the rejected S-NSSAIs in the list of rejected S-NSSAIs;

receive, from the UE, a second registration request message comprising the requested NSSAI through the AN;

receive a second service response from the network slice selection function, wherein the service response comprises a second plurality of allowed S-NSSAIs, wherein one or more S-NSSAIs in the first plurality of allowed NSSAI are missing from the requested NSSAI in second registration request based on the UE no longer using a network slice related to the missing S-NSSAIs;

after registering the UE with one of the S-NSSAIs from the second plurality of S-NSSAIs, determine that the UE is no longer using the one of the S-NSSAIs based on an update in the NSSAI that excluded the one of the S-NSSAIs that the UE is no longer using;

based on the determining, cause the UE to be deregistered; and after the UE is deregistered, cause the NSSF to decrement one or more counters associated with the one of the S-NSSAIs.

13. An apparatus according to claim 12 wherein the service response is dedicated to enforcement of the capping number of UEs per network slice.

14. An apparatus according to claim 12 wherein the one or more S-NSSAIs are each associated with S-NSSAI subscription information that includes a flag indicating a need to perform a limitation of a number of subscribers or a limitation of a number of allowed UEs.

15. An apparatus according to claim 12 wherein the second service further comprises an indication indicating that rejected S-NSSAIs are caused by upper limit of UEs per slice reached and an optional backoff timer indicating a wait time before attempting another registration request message including the rejected S-NSSAIs in the list of rejected S-NSSAIs.

16. An apparatus according to claim 12 wherein the at least one memory and the computer program code are further configured to, with the at least one processor, cause the apparatus at least to:

determining that the UE is no longer using one or more S-NSSAIs of the one or more allowed S-NSSAIs, wherein the determining is based on receiving a requested NSSAI in a new registration request message no longer including the one of the S-NSSAIs.

17. An apparatus comprising at least one processor and at least one memory including computer program code for one or more programs, the at least one memory and the computer program code configured to, with the at least one processor, cause the apparatus at least to:

receive, at a network slice selection function (NSSF), a service request message comprising one or more single Network Slice Selection Assistance Information (S-NSSAIs) subject to a capping number of user equipments (UEs) allowed to access one or more network slices associated with the one or more S-NSSAIs from an access and mobility function (AMF);

determine, by the NSSF, a current number of UEs allowed to access the one or more network slices associated with the one or more S-NSSAIs;

for each S-NSSAI:

in an instance where the number of UE allowed to access does not exceed a pre-defined limit on the maximum number of UEs using the network slice associated with the S-NSSAI, designate the S-NSSAI as an allowed S-NSSAI and increment a counter of number of UEs using the Network Slice associated with the S-NSSAI;

in an instance where the number of UE allowed to access the network slice exceeds a pre-defined limit on the network slice associated with the S-NSSAI, designate the S-NSSAI as a rejected S-NSSAI; and cause transmission of a service response comprising an allowed NSSAI that includes a first plurality of allowed S-NSSAIs and a list of rejected S-NSSAIs due to a maximum number of UEs allowed to access the network slices associated with the one or more S-NSSAIs has been reached;
cause transmission of a registration response message comprising the first plurality of allowed S-NSSAIs and the list of rejected S-NSSAIs due to the maximum number of UEs allowed to access the network slices associated with the one or more S-NSSAIs has been reached to the user equipment, the registration response message further cause codes indicating one or more rejections associated with the list of rejected S-NSSAIs that are caused by the upper limit of UEs per slice having been reached and a backoff timer indicating a wait time before attempting another registration request message including the rejected S-NSSAIs in the list of rejected S-NSSAIs;
receive a second registration request message comprising the requested NS SAI through the AN;
receive a second service response from the network slice selection function, wherein the service response comprises a second plurality of allowed S-NSSAIs, wherein one or more S-NSSAIs in the first plurality of allowed NSSAI are missing from the requested NSSAI in second registration request based on the UE no longer using a network slice related to the missing S-NSSAIs;
after registering the UE with one of the S-NSSAIs from the second plurality of S-NSSAIs, determine that the UE is no longer using the one of the S-NSSAIs based on an update in the NSSAI that excluded the one of the S-NSSAIs that the UE is no longer using;
based on the determining, cause the UE to be deregistered; and
after the UE is deregistered, cause the NSSF to decrement one or more counters associated with the one of the S-NSSAIs.

18. An apparatus according to claim 17 wherein the NSSF is configured to decrement one or more counters of number of UEs using the one or more network slices associated with the one or more S-NSSAIs upon receiving an indication that the UE is no longer using the one or more S-NSSAIs.

19. An apparatus according to claim 17 wherein the NSSF is configured by a visited public land mobile network based on a roaming agreement on a maximum number of UEs allowed per S-NSSAI for a home public land mobile network S-NSSAI.

20. An apparatus according to claim 17 wherein the NSSF is configured based on a service level agreement.

21. An apparatus according to claim 17 wherein the NSSF is a NSSF in a visited public land mobile network configured to interact with a NSSF of a home public land mobile network in an instance where the UE is roaming and a visited network detects that the UE inbound roamer is requesting or abandoning S-NSSAIs subject to capping and the counters of the current number of UEs allocated to access the network slice(s) are in the NSSF of the home public land mobile network.

22. An apparatus comprising at least one processor and at least one memory including computer program code for one or more programs, the at least one memory and the computer program code configured to, with the at least one processor, cause the apparatus at least to:
receive, from a user equipment (UE), a registration request message comprising requested Network Slice Selection Assistance Information (NSSAI) through an access network (AN), wherein the requested NSSAI comprises one or more single-NSSAIs (S-NSSAIs) subject to a capping number of UEs allowed to access one or more network slices associated with the one or more S-NSSAIs, wherein each of the one or more S-NSSAIs is supported by a single access and mobility function (AMF) or AMF set in a single public land mobile network (PLMN), and wherein all AMF in the AMF set share context data for instance using an unstructured data storage function (UDSF);
for each S-NSSAI:
in an instance where the number of UE allowed to access the network slice does not exceed a pre-defined limit on the network slice associated with the S-NSSAI stored in the shared context data, designate the S-NSSAI as an allowed S-NSSAI and increment a counter of number of UEs using the network slice associated with the S-NSSAI; and
in an instance where the number of UE allowed to access the network slice exceeds a pre-defined limit on the network slice associated with the S-NSSAI stored in the shared context data, designate the S-NSSAI as a rejected S-NSSAI; and
cause transmission of a registration response message comprising a first plurality of allowed S-NSSAIs and a list of rejected S-NSSAIs to the user equipment;
cause transmission of a registration response message comprising the first plurality of allowed S-NSSAIs and the list of rejected S-NSSAIs due to the maximum number of UEs allowed to access the network slices associated with the one or more S-NSSAIs has been reached to the user equipment, the registration response message further cause codes indicating one or more rejections associated with the list of rejected S-NSSAIs that are caused by the upper limit of UEs per slice having been reached and a backoff timer indicating a wait time before attempting another registration request message including the rejected S-NSSAIs in the list of rejected S-NSSAIs;
receive a second registration request message comprising the requested NS SAI through the AN;
receive a second service response from the network slice selection function, wherein the service response comprises a second plurality of allowed S-NSSAIs, wherein one or more S-NSSAIs in the first plurality of allowed NSSAI are missing from the requested NSSAI in second registration request based on the UE no longer using a network slice related to the missing S-NSSAIs;
after registering the UE with one of the S-NSSAIs from the second plurality of S-NSSAIs, determine that the UE is no longer using the one of the S-NSSAIs based on an update in the NSSAI that excluded the one of the S-NSSAIs that the UE is no longer using;
based on the determining, cause the UE to be deregistered; and
after the UE is deregistered, cause the NSSF to decrement one or more counters associated with the one of the S-NSSAIs.

* * * * *